United States Patent [19]

Rowe et al.

[11] 3,734,120
[45] May 22, 1973

[54] CONTROL MEANS FOR FLUID FLOW VALVES

[75] Inventors: Alan Charles Rowe, East Chinnock, near Yeovil; John Richardson Bennett, Yeovil, both of England

[73] Assignee: Normalair-Garrett (Holdings) Limited, Yeovil, Somerset, England

[22] Filed: Nov. 5, 1971

[21] Appl. No.: 195,992

[30] Foreign Application Priority Data

Nov. 20, 1970 Great Britain.....................55,347/70

[52] U.S. Cl................................................137/220
[51] Int. Cl..............................................F16k 31/12
[58] Field of Search............................137/116.3, 220

[56] References Cited

UNITED STATES PATENTS

| 1,841,608 | 1/1932 | Kruse | 137/220 |
| 3,362,424 | 1/1968 | Smith et al. | 137/220 |

Primary Examiner—Henry T. Klinksiek
Attorney—Roberts B. Larson et al.

[57] ABSTRACT

Control means for modulating the valve head of a fluid flow delivery valve to maintain substantially a desired flow condition. Pressure of the fluid flow being delivered operates pressure differential means which are arranged to regulate a pressure reducer through which fluid is supplied from upstream of the valve head to a datum pressure chamber. The valve head is responsive to pressure in the datum chamber and thereby is modulated by varying fluid flow delivery.

8 Claims, 1 Drawing Figure

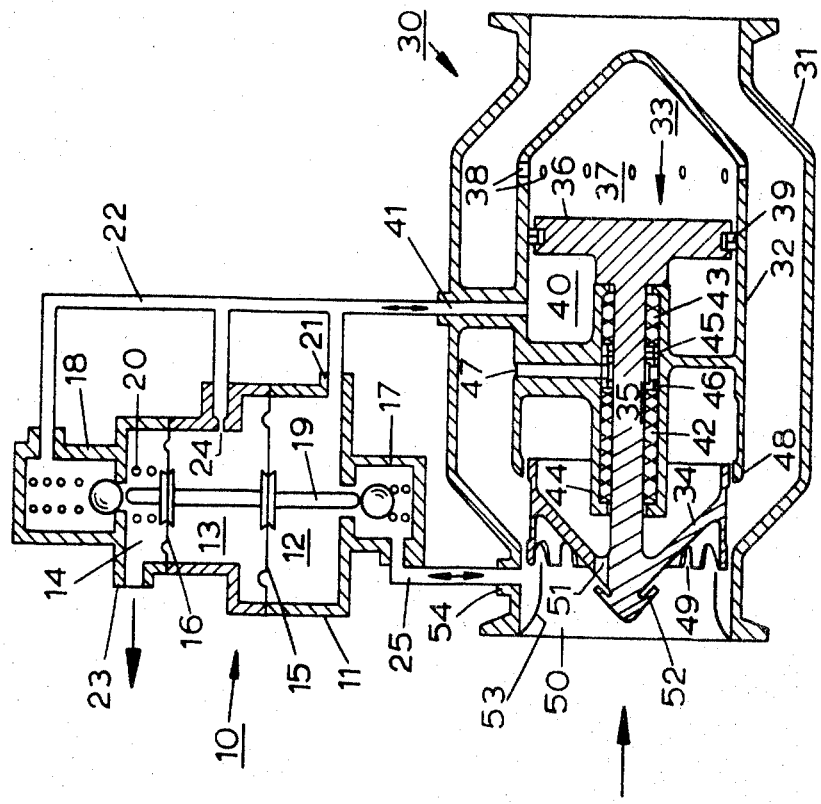

CONTROL MEANS FOR FLUID FLOW VALVES

This invention relates to fluid flow valves, especially but not exclusively, pneumatic valves, and has as one objective the provision of a simple and compact means, preferably incorporating a rate feature, for so controlling such a fluid flow valve as to maintain substantially a desired condition of flow from the valve. A further object is the provision of a fluid flow valve incorporating such control means in a compact assembly.

In one aspect, therefore, the invention provides for a fluid flow valve having a valve head movable to adjust fluid flow through the valve, control means comprising a differential pressure-sensitive mechanism adapted for operative association with the valve head and to be connected to respond to departure from a selected difference between a datum pressure and the pressure of the valve-controlled fluid downstream of the valve to cause movement of the valve head in the sense to restore said selected pressure difference, said datum pressure being derived from the fluid flow upstream of the valve head via a pressure reducing valve.

Desirably said reducing valve means are responsive both to changes in the datum pressure delivered thereby and to the rate of change of such pressure.

In preferred embodiments, said reducing valve means comprises a first chamber and a second chamber separated by a common movable wall responsive to the difference between the fluid pressures in the respective chambers; a pressure reducing valve controlled by the position of said movable wall and having its discharge connected to said first chamber; a relief valve also controlled by the position of said movable wall; and a datum pressure output line connected to said first chamber and to said relief valve and also, via a restriction, to said second chamber.

The invention also provides a fluid flow valve equipped with the said control means. Thus, in another aspect, the invention provides a fluid flow valve having a valve head movable to adjust fluid flow through the valve and control means including a displaceable wall bounding a datum pressure chamber and having its external face exposed to the valve-controlled fluid downstream of said valve head, said wall being operatively connected to said valve head to move the latter in valve-closing direction by displacement of the wall in response to rising downstream controlled fluid pressure, and conversely; and pressure reducing valve means for supplying said datum pressure chamber with controlled fluid from upstream of said valve head at a datum pressure selected in accordance with a required downstream controlled fluid pressure.

In such a valve, the said pressure reducing valve means for supplying controlled fluid to the datum pressure chamber desirably comprise a first chamber and a second chamber separated by a common movable wall responsive to the difference between the fluid pressures in the respective chambers; a pressure reducing valve controlled by the position of said movable wall and having its discharge connected to said first chamber; a relief valve also controlled by the position of said movable wall and a datum pressure line connecting said datum pressure chamber to said first chamber and to said relief valve and also, via a restriction, to said second chamber.

Preferably the valve head is a pressure-balanced axially movable member supported by an inner valve housing accommodating a datum pressure chamber.

The invention will now be described by way of example with reference to the accompanying drawing, which schematically illustrates an in-line pressure regulating valve equipped with control means according to the invention.

An in-line valve is one in which the valve head moves axially in substantial alignment with the fluid flowing through it. In the illustrated valve, part of the control means is housed in an inner housing within the valve and part, namely a pressure reducing and relief valve assembly 10, is external.

The assembly 10 comprises a substantially cylindrical body 11 containing three axially disposed chambers, namely, a first outer chamber 12, a central chamber 13 and a second outer chamber 14. The central chamber 13 is separated from the first and second outer chambers 12, 14, by flexible rolling diaphragms 15, 16, respectively. On the axial center line of the body 11 at the outboard side of the first outer chamber 12 is provided a pressure reducing valve 17, whilst similarly positioned on the outboard side of the second outer chamber 14 is a relief valve 18. A push-rod 19 is sealed to and supported by the diaphragms 15, 16, in a manner such that it can move axially and actuate the two valves 17, 18. The push-rod 19 is biased towards opening the pressure reducing valve 17 by a compression spring 20 housed in second outer chamber 14. Adjustment of the reducing valve is provided by means of a rate adjuster (not shown) associated with spring 20. An outlet 21 from first outer chamber 12 connects with a manifold conduit 22 which communicates with ambient by way of the relief valve 18 and second outer chamber 14 which is provided with a vent connection 23; it also connects with central chamber 13 by way of an orifice 24. The manifold conduit 22 also provides for connection with a datum pressure chamber 40 of the in-line valve 30. An inlet 25 to the reducing valve 17 provides connection with a region of the valve 30 upstream of the valve head thereof.

The in-line valve 30 comprises a substantially tubular casing 31 supporting coaxially with its interior a body 32 providing a housing for a valve assembly 33. The valve assembly 33 comprises a valve head 34 projecting from the upstream end of the body 32 and secured by a spindle 35 to a piston 36 operating in a chamber 37 at the downstream end of the body 32. The wall of the chamber 37 is provided with holes 38, which enables the face of the piston 36 to sense pressure downstream of the valve head 34. The piston 36 makes a sliding seal within the chamber 37 by means of a piston ring type seal 39, whereby the chamber 37 is divided to create a datum pressure chamber 40 at the back of the piston 36. Conduit connection to the datum pressure chamber is by way of a duct 41 through a web supporting the body 32 within the casing 31, and connects with the manifold conduit 22 of the control means 10. The valve spindle 35 slides in front and rear bearings 42, 43, carried in a bearing housing 44 of the body 32. Between the bearings 42, 43, is a seal 45 and a grooved and ported collar 46. The collar 46 is positioned between the front bearing 42 and the seal 45. The collar 46 is aligned with a portway 47 communicating with the outside of the body 32, whereby fluid seeping past the front bearing may escape which, together with the seal 45, substantially prevents seepage into the datum pressure chamber 40. The upstream end of the body 32 provides a shroud 48 into which the valve head 34 moves when opening. The valve head 34 is in the form of a skirted piston and has the upstream edge of the skirt scalloped in a manner such that, when the valve head 34 is fully forward, i.e., closing the valve, the scallops 49 are completely shielded by the walls of the entry duct 50 of the casing 31. The scallops 49 are shaped so that, as the valve head 34 initially moves towards the open position or moves finally towards the closed position, the area of the flow passage varies at a rate that is more gradual than when the edge of the valve head 34 is moving within the region of increasing diameter of the casing 31. To ensure pressure balance across the valve head 34 at least one hole 51 is provided therethrough, being screened by a coned shield 52. The small annular clearance between the upstream edge of the skirt of the valve head 34 and the entry duct 50 and the similar clearance between the downstream edge of the skirt of the valve head and the shroud 48 is protected from dirt in the fluid flow by an annular shield 53 pressed into the entry 50. A pressure tapping connection 54 communicates with the annular region in the entry formed by the shield 53 and connects with the pressure reducing valve 17 of the control means 10. A light spring (not shown) moves the piston assembly 33 to the closed position when the valve 30 is inoperative.

In operation of the invention according to the embodiment hereinbefore described the control means obtains a high pressure fluid supply from the in-line valve 30 by way of connection 54 and inlet 25 of the pressure reducing valve 17, whilst control pressure is conveyed to the datum pressure chamber 40 by way of the manifold conduit 22 and duct 41. When the valve 30 is providing the required downstream pressure and the valve assembly 33 is stationary the pressure in first outer chamber 12, central chamber 13, the manifold conduit 22 and the datum pressure chamber 40 is static, and under such conditions the pressure in the control means is such that the diaphragm 15 has no pressure differential across it, and in consequence the pressure reducing valve 17 is held open to a predetermined position by influence only of the spring 20. When pressure downstream of the valve head 34 falls, it also obtains in the piston chamber 37 by way of the holes 38, and causes a pressure differential across the piston 36 which tends to move to the right in the drawing. Due to the reduced pressure in datum pressure chamber 40, conduit manifold 22 and the first outer chamber 12, and due to restriction 24, a pressure differential is created across the diaphragm 15 (the greater pressure being in the central chamber 13), whereby the push-rod 19 is moved to open further the reducing valve 17, so that the pressure rebuilds in first outer chamber 12, conduit manifold 22, and datum pressure chamber 40, which resets the pressure reducing valve 17 to be again influenced only by the spring 20, and so causes the piston 36 to return to the left which also returns the valve head to an appropriate regulating position.

When the downstream pressure in the valve 30 rises above the required pressure the valve assembly 33 moves to the left in the drawing and increases the control pressure in the datum pressure chamber 40, conduit manifold 22 and first outer chamber 12; such action causes the effect of the spring 20 to be reduced by the increased pressure applied to diaphragm 15, so that the push-rod 19 is moved to cause the pressure reducer 17 to close accordingly and establish an appropriate pressure in the datum pressure chamber 40. In the control means 10 pressure varies in the central chamber 13 at a slower rate than in the first outer chamber 12, and the manifold conduit 22, due to the orifice 24; thus the effect of differential pressure on the diaphragm reduces as the pressure in the central chamber 13 changes towards equalling that in the first outer chamber.

It will be observed that, using control means as described herein, the rate of response of the valve assembly 33 varies with the rate of change of the downstream pressure. When a change of downstream pressure is small and slow the resulting pressure difference across the diaphragm 15 also is small, due to there being little flow requiring to pass through the orifice 24 with consequently little throttling effect upon that flow, thereby causing slight movement of the valve assembly 33. However, in circumstances of a sudden and large change of downstream pressure the resulting pressure difference across the diaphragm also is large and quickly obtained due to the considerable throttling effect of the orifice 24 upon the flow therethrough; such conditions cause rapid movement of the valve assembly 33 which overshoots the position at which it would be in balance to correct the downstream pressure change. Overshoot movement of a valve assembly whilst speeding attainment of the desired correction usually introduces a tendency for the valve assembly to hunt. This control means eliminates any significant hunting because, as the differential pressure across the diaphragm reduces during continuance of flow through the orifice 24, effect upon the valve assembly 33 also reduces, thus the urge for the valve assembly 33 to overshoot is diminished, and it returns to the position of balance and thence to the control position, to substantially maintain the desired downstream pressure.

It is to be understood that arrangements alternative to the embodiment herein described and illustrated may be provided without departing from the scope of the present invention, for example, the diaphragms of the control means may be substituted by pistons.

We claim as our invention:

1. In a fluid flow valve having a valve head movable to adjust fluid flow through the valve, control means comprising a differential pressure sensitive mechanism for operably regulating the valve head, a datum pressure chamber, a duct connecting fluid flow upstream of the valve head with said datum pressure chamber, said mechanism including a pressure reducing valve for regulating pressure of fluid in said duct, a movable surface defining one wall of said datum pressure chamber, means exposing said wall-defining movable surface to pressure of fluid downstream of the valve head, means operably interconnecting the valve head and the movable surface, said pressure reducing valve having a valve actuating member, and means exposing said valve actuating member on two opposed surfaces to pressure of fluid in the duct downstream of the reducing valve, exposure of one surface being by way of restricted fluid connection to the duct and of the other surface being by way of unrestricted fluid connection to the duct.

2. Control means as claimed in claim 1, wherein the valve actuating member of the reducing valve is operably connected to a pressure relief valve arranged to relieve pressure from the duct.

3. Control means as claimed in claim 2, wherein the valve actuating member of the reducing valve provides a common movable wall separating a first and a second chamber, the discharge of the reducing valve being connected to the first chamber so forming part of the duct, and the second chamber being connected to the duct by way of the restricted fluid connection.

4. Control means as claimed in claim 3, wherein the valve actuating member of the reducing valve provides a common movable wall separating the second chamber and a discharge chamber of the relief valve, the valve actuating member further providing a push rod secured to the two common movable walls and operably connected to the reducing valve at one end and to the relief valve at the other end.

5. In a fluid flow valve having a valve head movable to adjust fluid flow through the valve, control means comprising a differential pressure-sensitive mechanism for operably regulating the valve head, a datum pressure chamber, said mechanism including a pressure reducing valve for regulating pressure of fluid in a duct connecting fluid flow upstream of the valve head with said datum pressure chamber, a piston defining one wall of the datum pressure chamber being exposed to pressure of fluid downstream of the valve head, the valve head and the piston being operably interconnected, a valve actuating member of the pressure reducing valve being exposed on both sides to pressure of fluid in the duct downstream of the reducing valve, exposure of one side being by way of restricted fluid connection to the duct and of the other side being by way of unrestricted fluid connection to the duct.

6. Control means as claimed in claim 5, wherein the valve head and piston are supported for axial movement in an inner housing disposed concentrically in the body of the fluid flow valve, and the axial movement of the valve head providing variable closure with a cooperating annulus disposed so as to regulate flow past the inner housing.

7. Control means as claimed in claim 6, wherein the valve head is of annular shape being supported by a perforate web from a shaft extending from the piston.

8. Control means as claimed in claim 7, wherein the upstream edge of the valve head is notched, and the annulus is coaxial with the valve head, determining by their axial relationship the area available to fluid flow.

* * * * *